June 11, 1929.  C. C. BRADBURY  1,716,482
LUBRICATING SYSTEM
Filed April 3, 1922
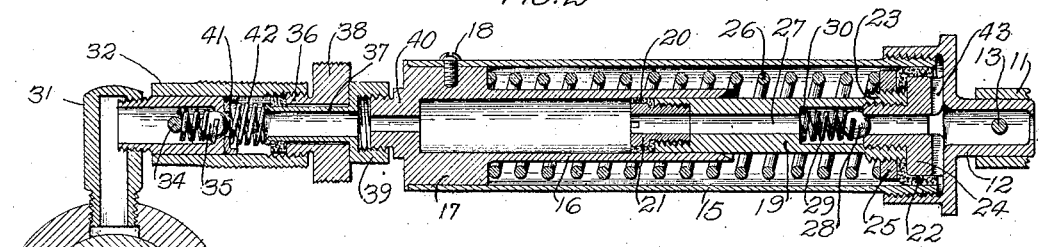
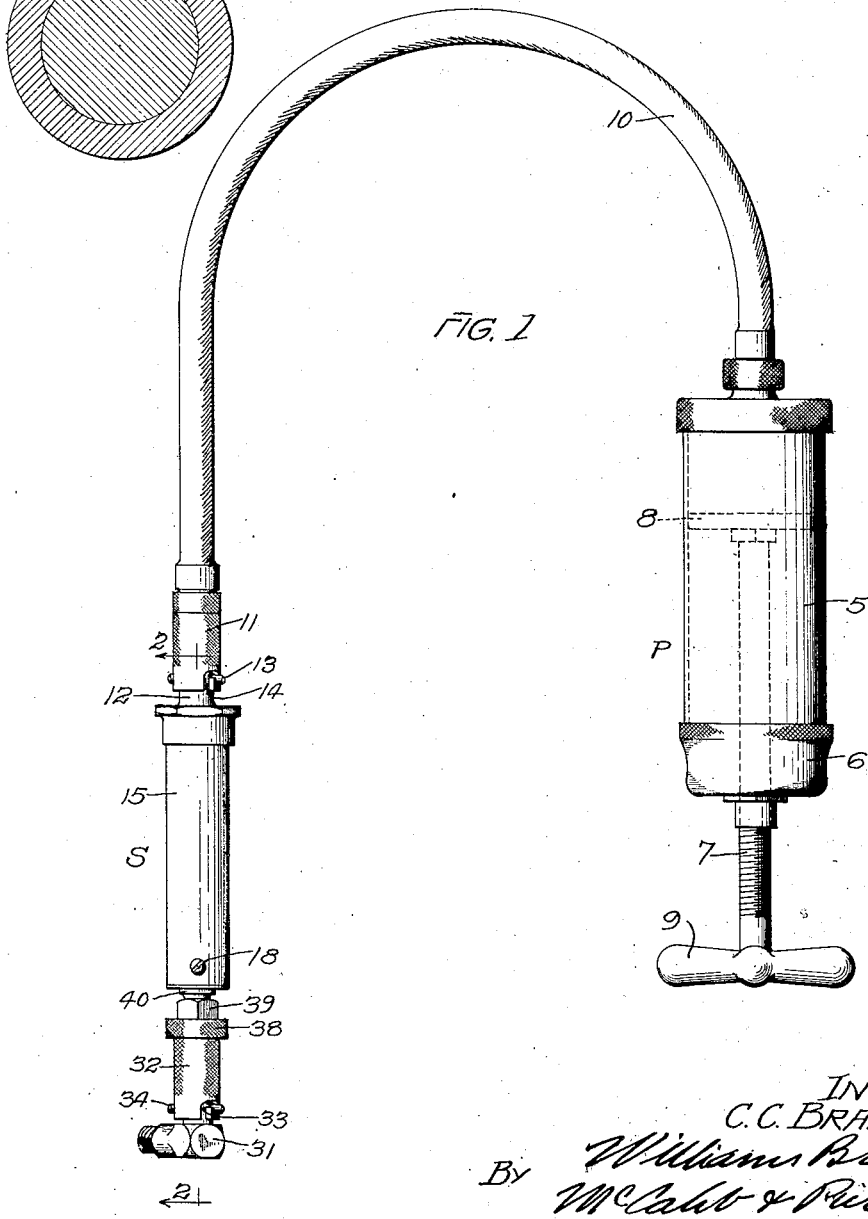

Patented June 11, 1929.

1,716,482

UNITED STATES PATENT OFFICE.

CLIFFORD C. BRADBURY, OF OAK PARK, ILLINOIS, ASSIGNOR TO ALEMITE MANUFACTURING CORPORATION, OF CHICAGO, ILLINOIS, A CORPORATION OF DELAWARE.

LUBRICATING SYSTEM.

Application filed April 3, 1922. Serial No. 548,986.

My invention relates to improvements in lubricating systems and is particularly concerned with, though not limited to, the lubricating systems of the type comprising a plurality of fittings or nipples, one of which is secured to each of the bearings to be lubricated, and a high pressure lubricant compressor having a discharge conduit provided with a coupling member adapted to be successively attached to and detached from the fittings so as to permit lubricant under high pressure to be forced into the bearings through the fittings.

With such systems, it is possible easily to develop pressures of from 500 to 1,000 pounds per square inch, which are usually adequate for the purpose intended. It sometimes happens, however, that, where a bearing has not been lubricated for some time, or, for other reasons, the used lubricant becomes hardened, it is very difficult to develop sufficient pressure in the type of compressor forming a part of such system to dislodge this more or less congealed and hardened, used lubricant.

Furthermore, the development of excessively high pressures in a compressor and the discharge conduit of the compressor is undesirable because they are not designed to withstand such excessive pressures. Particularly is this true of the discharge conduit which is usually formed of flexible metallic conduit. It is sometimes necessary to develop pressures as high as 5,000 pounds per square inch in order to dislodge the used lubricant from a bearing, and such pressure might injure not only the discharge conduit, but also the compressor itself.

One of the objects of my invention is, therefore, to provide a lubricating system to such construction that it will be comparatively easy to subject the lubricant to excessively high pressures to enable lubricant to be forced into bearings having high resistance.

Another object of my invention is to provide a lubricating system comprising a compressor of the character described in which the means for increasing the pressure on the lubricant becomes operative or acts only when there is a necessity of developing such high pressures.

A third object is to provide a compressor such as described in which the pressure-increasing means operates automatically whenever the conditions require its operation.

A still further object of my invention is to provide a lubricating system comprising a primary compressor having a discharge conduit, and a secondary compressor connected with said discharge conduit and provided with means for preventing the high pressures developed in the secondary compressor from being communicated to the primary compressor or its discharge conduit.

My invention also contemplates the provision of a secondary compressor which can be easily and quickly attached to and detached from the primary comp" .ssor so that the operator can quickly bring it into service when necessary.

Other objects of my invention will appear as this description progresses, reference being had to the accompanying drawings, in which:

Figure 1 is a side elevation of a lubricating system embodying my invention; and Figure 2 is a central longitudinal section through the secondary compressor of my improved system, this view being taken on line 2—2 of Figure 1.

Throughout both of the figures of the drawing, similar reference characters will be used for referring to similar parts.

The embodiment of my invention which I have illustrated comprises a primary compressor indicated in general by the reference character P, the one shown being a well-known type of compressor and comprising a cylinder 5 having a removable cap 6 at one end, which can be removed for the purpose of filling the barrel. A piston rod 7 is threaded through the cap 6 and provided at its inner end with a suitable piston 8 and at its outer end with a handle 9 by means of which it can be rotated. The barrel 5 is provided with a flexible metallic discharge conduit 10, the free end of which is provided with a swivel coupling 11 of well-known type. The details of construction of this coupling member may be greatly varied without departing from my invention, as the only purpose of this coupling member is to make a detachable sealed connection with the coupling member 12 secured to one end of the secondary compressor indicated as a whole by the reference character S. The coupling member 12 as shown is provided with a pin 13, the opposite ends of which project beyond the walls of the coupling member 12 and are adapted to co-act with the bayonet slots 14 in the coupling 11 to detachably connect these two members.

The secondary compressor forming a part of my improved system comprises a pair of differential cylinders, the larger of which is indicated by the reference character 15 and the smaller of which is indicated by the reference character 16. The outer end of the smaller cylinder is enlarged to form a plug 17 for closing the end of the cylinder 15 remote from the coupling member 12, which closes the opposite end of the larger cylinder, as shown in Figure 2. A screw 18, or any other suitable means, may be used for retaining the smaller cylinder in place within the larger cylinder.

Reciprocably mounted within the differential cylinders is a differential piston comprising a tubular member 19, to one end of which is secured the cup leather or gasket 20 by means of the thimble 21, which has screw-threaded engagement with the tubular member 19. This end of the differential piston operates in the smaller cylinder 16. The larger gasket 22, snugly fitting the larger cylinder, is secured to the opposite end of the tubular member 19 by means of the thimble 23, between the overhanging flange 24 of which and the nut 25, threaded upon the exterior of the tubular member 19, is clamped the inner end of the gasket 22. A helical spring 26, confined between the enlargement 17 of the cylinder 16 and the nut 25, provides means for yieldingly holding the differential piston in the position shown in Figure 2. A bore 27 extends through the thimble 21, the tubular member 19 and the thimble 23 and affords communication between the two cylinders and also provides a passageway for the flow of lubricant from the primary compressor through the secondary compressor to the bearing to be lubricated.

I provide a check valve 28 for yieldingly closing the passageway 27, this check valve being held in place against the inner end of the thimble 23 by means of a helical spring 29, the inner end of which abuts against the shoulder 30 formed in the bore 27. This check valve closes toward the primary compressor. The tension of this spring 29 is such that it will permit the valve 38 to be opened by grease under a pressure insufficient to cause the large piston 24 to overcome the tension exerted upon it by the spring 26. I provide coupling means for connecting the smaller or high pressure cylinder 16 with a fitting 31 secured to a bearing comprising a sleeve 32, having a pair of oppositely disposed bayonet slots 33 formed in its outer ends for co-acting with the ends of the pin 34 extending from the fitting 31. This fitting is of a well-known type and comprises a spring pressed closure 35 for closing its outer end. The sleeve 32 is secured at its inner end to a second sleeve 36 which is rotatably mounted upon the tubular member 37, the sleeve 36 being provided with an enlargement 38 which is narrowed upon its outer periphery, this member being used for rotating the sleeve 32 in making connection with a fitting. The inner end of the tubular member 37 is enlarged, as shown at 39, and has a threaded engagement with the tubular boss 40 extending from the outer end of the cylinder 16. Slidably mounted in the sleeve 32 is a cup leather or gasket 41 which is yieldingly urged in an outward direction by the spring 42. The details of construction of the swivel coupling member just described are well-known to those skilled in this art and further description thereof appears to be unnecessary. The only purpose of this coupling is to provide means for easily and quickly attaching and detaching the discharge end of the secondary compressor with the various fittings to be supplied with lubricant.

When a primary compressor such as I have described is provided with the secondary compressor described above, and when the plunger of the primary compressor is actuated to place the lubricant therein under pressure, if the resistance of the bearing to which the lubricant is being supplied is not too great, the lubricant will flow through the discharge conduit 10, then open the check valve 28, pass through the bore 27, the cylinder 16 and the coupling member associated with this cylinder into the fitting without actuating the differential piston. If, however, the resistance of the bearing requires more than a predetermined amount of pressure to force lubricant into the bearing, as the pressure on the lubricant is increased, a point will be reached where the pressure exerted upon the enlarged end of the differential piston will begin to move the piston against the tension of the spring 26. It will be noticed that there is a space 43 between the end of the large cylinder and the large piston which permits the pressure of the lubricant to be exerted upon the entire area of the larger end of the piston. Upon the initial movement of the piston, the spring 29 will bias the check valve 28 to its closed position, since the pressures on the lubricant on opposite sides of the check valve are the same. Further inward movement of the differential piston will, by reason of the difference in areas of the two ends thereof, place the lubricant in the cylinder 16 under greater pressure than that being impressed upon the lubricant in the larger cylinder, and, as the lubricant is continued to be discharged from the primary compressor, the plunger will move into the smaller cylinder 16, displacing the lubricant therefrom under a pressure higher than the pressure in the primary compressor. It will, of course, be apparent that the increase in pressure impressed upon the lubricant in the cylinder 16 will depend upon the relative areas of the opposite ends of the differential piston. It should also be noticed that the closing of the check valve 28 under the superior pressure in the cylinder 16 prevents this high pressure from being communicated to the flexible hose 10 and the primary compressor. This is very important, as it relieves these two elements of the excessively high pressures which may be developed in the cylinder 16.

While I have disclosed my secondary compressor as comprising a self-contained unit which can be attached to or detached from the primary compressor as desired, it is entirely possible and practicable to permanently attach the secondary compressor with the free end of the discharged conduit of the primary compressor. This would, of course, mean the elimination of the coupling 11,—that is, the free end of the conduit 10 would be connected directly with and permanently to the low pressure end of the secondary compressor.

While I have described the details of construction of the preferred embodiment of my invention, it is to be clearly understood that my invention is not limited to these details, but is capable of other adaptations and modifications within the scope of the appended claims.

Having thus described my invention, what I claim is:

1. A lubricating system comprising a primary compressor having a discharge conduit and a secondary compressor connected to the end of said discharge conduit and comprising a pair of differential cylinders, the larger of which communicates with said discharge conduit, a differential piston reciprocable in said differential cylinders and having a passageway for establishing communication between said cylinders, a spring pressed check valve in said passageway closing toward said primary compressor, yieldable means for urging said piston in one direction and means for connecting the smaller of said cylinders with a bearing.

2. A lubricating system comprising a bearing to be lubricated and means for supplying lubricant to said bearing comprising a source of lubricant, a conduit leading from said source of lubricant, a single compressor for forcing the lubricant under pressure through said conduit and for subsequently relieving the pressure on the lubricant, and means for connecting said conduit with said bearing comprising a pair of differential cylinders, a differential piston reciprocable in said cylinders, a lubricant pressed cup leather associated with each piston, a spring for returning said piston toward the intake ends of said cylinders, said connecting means having a passageway leading from the inlet end of the larger of said differential cylinders to the inlet end of the smaller of said differential cylinders and communicating with said conduit, said piston embodying means for closing said passageway when said piston moves in a direction to discharge lubricant from said smaller cylinder, and a spring check valve for preventing return flow of lubricant to said smaller cylinder.

3. An automatic lubricant pressure increasing device comprising two cylinders of different cross-sectional area and separated by an imperforate wall, differential pistons therein, means for supplying lubricant under pressure to the larger piston, means for permitting flow of lubricant from the larger to the smaller cylinder upon a predetermined pressure difference in said cylinders and for preventing flow of lubricant in the opposite direction, a spring normally urging said piston and plunger toward the ends of their respective cylinders, and means for connecting the smaller cylinder to a bearing to be lubricated.

4. A lubricant compressor comprising means for supplying lubricant under pressure to a bearing, a barrel having its head end connected thereto, a separate cylinder detachably connected with and of smaller effective area than said barrel, differential pistons operative in said barrel and cylinder, resilient means for moving said pistons toward the head end of said barrel, a spring operated check valved by-pass leading from the head end of said barrel to a point in communication with said cylinder, and means communicating with said cylinder for making a connection with the bearing.

In witness whereof, I hereunto subscribe my name this 30th day of March, 1922.

CLIFFORD C. BRADBURY.